US012611352B1

(12) United States Patent
Saunders

(10) Patent No.: US 12,611,352 B1
(45) Date of Patent: Apr. 28, 2026

(54) SPINE MOBILITY ENHANCEMENT SYSTEM AND METHOD OF USE THEREOF

(71) Applicant: William G. Saunders, Vermillion, SD (US)

(72) Inventor: William G. Saunders, Vermillion, SD (US)

( * ) Notice: Subject to any disclaimer, the term of this patent is extended or adjusted under 35 U.S.C. 154(b) by 185 days.

(21) Appl. No.: 18/442,408

(22) Filed: Feb. 15, 2024

(51) Int. Cl.
*A61H 1/02* (2006.01)

(52) U.S. Cl.
CPC ... *A61H 1/0229* (2013.01); *A61H 2201/1621* (2013.01); *A61H 2201/1671* (2013.01); *A61H 2201/1695* (2013.01); *A61H 2203/0493* (2013.01)

(58) Field of Classification Search
CPC .. A61H 1/0229; A61H 1/0222; A61H 1/0292; A61H 1/0218; A61H 1/008; A61H 39/04; A61F 5/02; A61F 5/04; A61F 5/042; A61F 5/048; A61F 5/05; A61F 5/30; A61F 5/24; A61F 5/03; A61G 13/121; A61G 13/122; A61G 13/1225; A61G 13/1255; A61G 13/1285; A61G 13/1295
See application file for complete search history.

(56) References Cited

U.S. PATENT DOCUMENTS

| | | | | | |
|---|---|---|---|---|---|
| 2,026,332 | A | * | 12/1935 | Walstrom | A61H 1/008 606/240 |
| 6,319,213 | B1 | | 11/2001 | Tomac | |
| 6,681,770 | B1 | | 1/2004 | Dreher | |
| 8,012,073 | B2 | | 9/2011 | Barnett | |
| 10,675,215 | B1 | * | 6/2020 | Yoon | A61H 1/008 |
| 12,370,115 | B1 | * | 7/2025 | Wing | A61H 1/0229 |
| 2001/0029345 | A1 | * | 10/2001 | Anderson | A61H 1/0229 602/35 |
| 2002/0068888 | A1 | * | 6/2002 | Wang | A61H 7/002 601/134 |
| 2008/0312690 | A1 | * | 12/2008 | Tsai | A61H 1/008 606/237 |
| 2009/0054216 | A1 | | 2/2009 | Teeter | |
| 2013/0059706 | A1 | | 3/2013 | Leier | |
| 2016/0346158 | A1 | * | 12/2016 | Leier | A61H 1/0229 |
| 2021/0196946 | A1 | * | 7/2021 | Castillo | A61N 1/36003 |
| 2021/0244597 | A1 | | 8/2021 | Sepulveda | |

FOREIGN PATENT DOCUMENTS

| | | |
|---|---|---|
| CN | 108354826 | 8/2018 |

* cited by examiner

*Primary Examiner* — Rachael E Bredefeld
(74) *Attorney, Agent, or Firm* — Jeffrey A. Proehl; Woods Fuller Shultz & Smith P.C.

(57) ABSTRACT

A spinal mobility enhancement system may comprise a body inclination apparatus which may include a support platform having a platform surface for resting a person's body thereon and having a longitudinal midline. The system may also comprise a spinal mobility enhancement device movably secured on the inclination apparatus along the longitudinal midline to engage the back surface of the body of the person on the platform surface of the support platform. The mobility enhancement device may have a pressure portion configured to cause pressure to be applied to a pair of spaced regions of the back surface of the body by a pair of raised surfaces of the device. The raised surfaces may be spaced from each other in a lateral direction with an air gap being defined between the raised surfaces which corresponds to a position of the spine of the body of the person positioned on the platform.

15 Claims, 5 Drawing Sheets

SPINE MOBILITY ENHANCEMENT SYSTEM AND METHOD OF USE THEREOF

BACKGROUND

Field

The present disclosure relates to body manipulation devices and more particularly pertains to a new spine mobility enhancement system and method of use thereof.

SUMMARY

In one aspect, the disclosure relates to a spinal mobility enhancement system for adjusting of a body of a person. The system may comprise a body inclination apparatus configured to support the body of the person in an upright position and an inclined position and positions between the upright and inclined positions. The inclination apparatus may include a support platform having a platform surface for resting the body thereon, and the platform surface may generally define a support plane. The support platform may be elongated with a longitudinal direction and a lateral direction extending substantially perpendicular to the longitudinal direction. The support platform has a longitudinal midline extending in the longitudinal direction of the support platform for positioning the spine of the body of the person adjacent to the longitudinal midline of the support platform. The inclination apparatus may also include a support frame for resting upon a floor and being configured to support the support platform in an elevated condition above the floor. The support platform may be pivotally mounted on the support frame at a pivot so as to pivot along a pivot axis. The system may also comprise a spinal mobility enhancement device which is movably secured on the body inclination apparatus along the longitudinal midline to engage the back surface of the body of the person on the platform surface of the support platform. The mobility enhancement device may include a base portion resting upon the platform surface, and a pressure portion on the base portion and being configured to cause pressure to be applied to a pair of spaced regions of the back surface of the body of the person on the platform surface when the support platform is moved from the upright position to the inclined position. The pressure portion has a pair of raised surfaces raised with respect to the support plane of the platform surface, and the raised surfaces may be substantially planar and coplanar with each other. The pair of raised surfaces may be spaced from each other in the lateral direction of the support platform, and an air gap may be defined between the spaced pair of raised surfaces such that a channel is defined between the surfaces to corresponding to a position of the spine of the body of the person positioned on the platform surface of the support platform. The system may also include a mounting structure configured to movably mount the spinal mobility enhancement device on the body inclination apparatus in a manner permitting positioning of the enhancement device at different locations along the longitudinal midline of the support platform.

In another aspect, the disclosure relates to a spinal mobility enhancement system for adjusting of a body of a person, and the system may comprise a body inclination apparatus configured to support the body of the person in an upright position and an inclined position and positions between the upright and inclined positions. The inclination apparatus may include a support platform having a platform surface for resting the body thereon, and the platform surface generally defining a support plane. The support platform may be elongated with a longitudinal direction and a lateral direction extending substantially perpendicular to the longitudinal direction. The support platform has a longitudinal midline extending in the longitudinal direction of the support platform for positioning the spine of the body of the person adjacent to the longitudinal midline of the support platform. Inclination apparatus may also include a support frame for resting upon a floor and being configured to support the support platform in an elevated condition above the floor. The support platform may be pivotally mounted on the support frame at a pivot so as to pivot along a pivot axis. The system may also comprise a spinal mobility enhancement device movably secured on the body inclination apparatus along the longitudinal midline to engage the back surface of the body of the person on the platform surface of the support platform. The spinal mobility enhancement device may include a base portion resting upon the platform surface, and the base portion may include a base plate. The enhancement device may further include a pressure portion on the base portion that is configured to cause pressure to be applied to a pair of spaced regions of the back surface of the body of the person on the platform surface when the support platform is moved from the upright position to the inclined position. The pressure portion has a pair of raised surfaces raised with respect to the support plane of the platform surface, and each of the raised surfaces may be formed by a pressure element. The raised surfaces may be substantially planar and coplanar with each other, and each of the raised surfaces may be oriented substantially parallel to the support plane of the platform surface. Each of the raised surfaces may be elongated in the longitudinal direction of the support platform. The pair of raised surfaces may be spaced from each other in the lateral direction of the support platform, and an air gap may be defined between the spaced pair of raised surfaces such that the raised surfaces are located on opposite sides of the longitudinal midline of the support platform for causing pressure to regions of the back surface on opposite lateral sides of the spine of the body. A channel may be defined between the surfaces to corresponding to a position of the spine of the body of the person positioned on the platform surface of the support platform.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
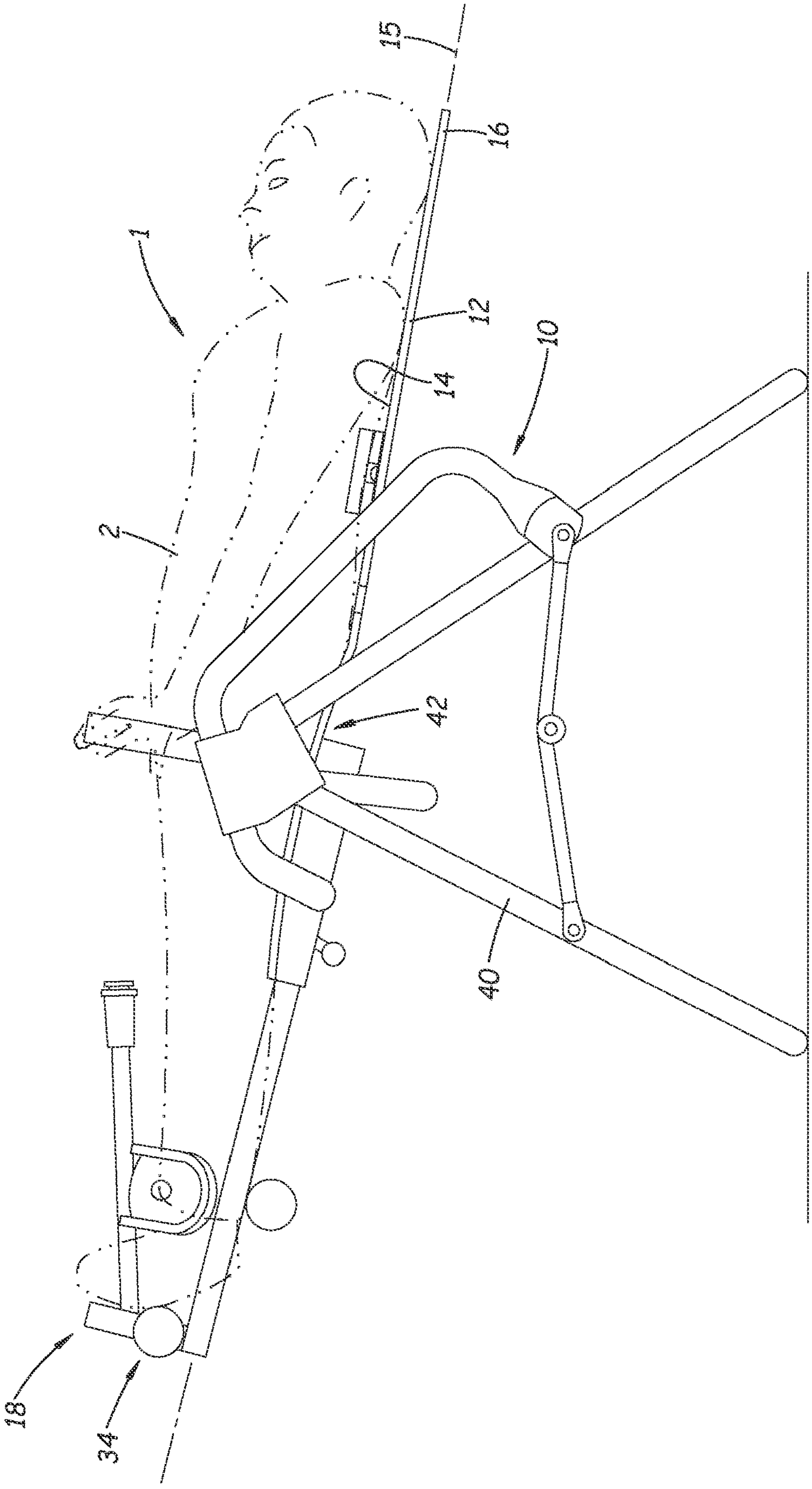
FIG. 1 is a schematic side view of a new spine mobility enhancement system relative to the body of a person, a person according to the present disclosure.
Figure 2:
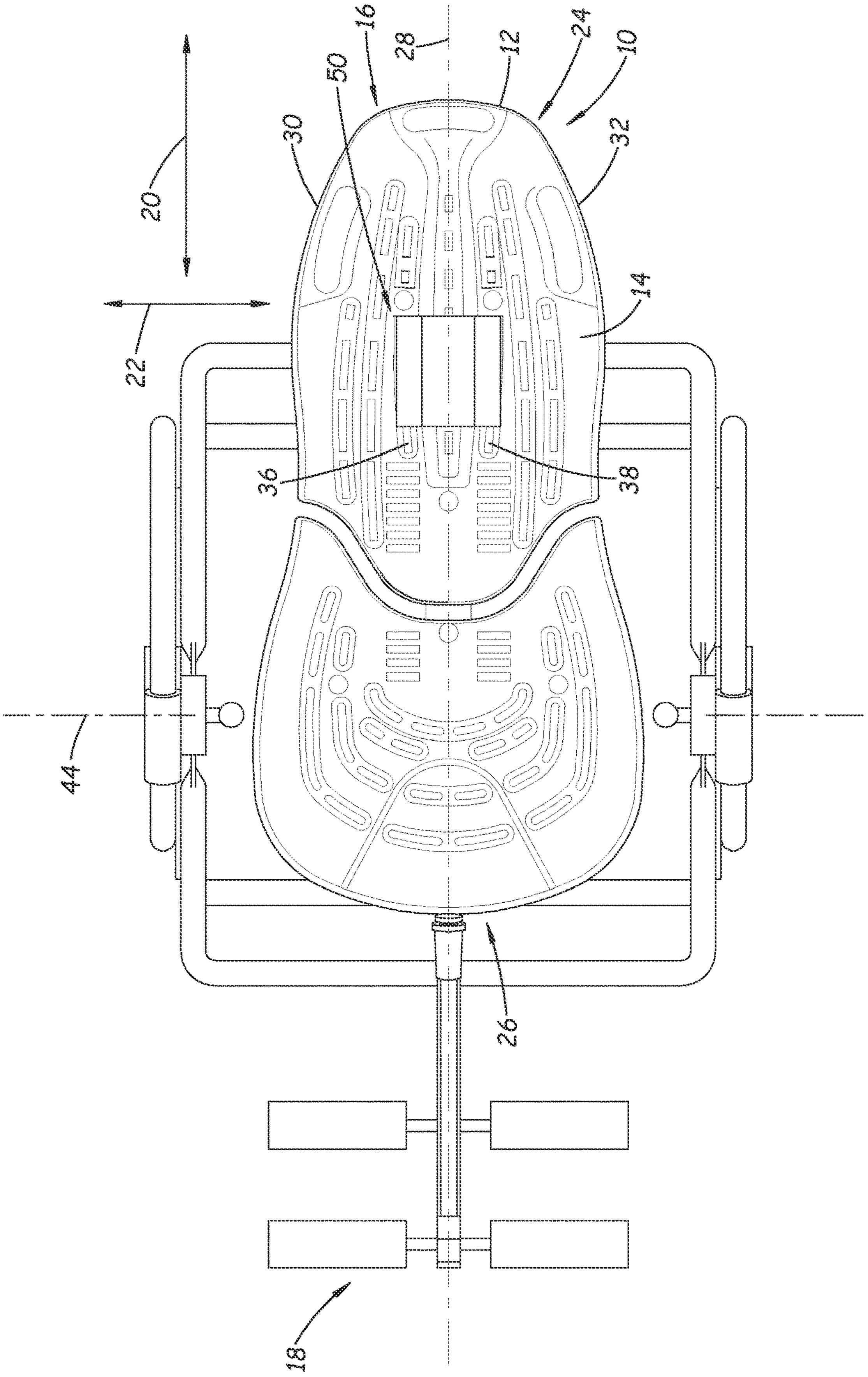
FIG. 2 is a schematic top view of the support platform of the body inclination apparatus with the spinal mobility enhancement device located thereon, according to an illustrative embodiment.

With reference now to the drawings, and in particular to FIGS. 1 through 5 thereof, a new spine mobility enhancement system and method of use thereof embodying the principles and concepts of the disclosed subject matter will be described.

The applicant has recognized the advantage of using the patient's own body weight to cause the application of pressure to focused portions of the back of the patient. The applicant has found that application of pressure in separate but coordinated locations of the back of the patient, particularly applied to the back on opposite sides of the spine, and along sections of the spine, may be particularly advantageous.

The applicant has also recognized the benefit of being able to adjust the amount of pressure applied to then back of the patient by changing the orientation of the patient's body between, for example, an upright or substantially upright position which produces the least amount of pressure, and a fully reclined or prone position which produces the greatest amount of pressure.

Additionally, the applicant has recognized the benefits of applying the pressure to selected areas of the back accompanied by the benefits of various degrees of inversion of the patient's body including reduction in the compression of portions of the back by the inversion.

The disclosure generally relates to a spinal mobility enhancement system 1 which may be utilized for manipulation of the body 2 of a person or patient. In general, the body 2 of the person has a torso with a back surface and a spine which extends through the torso at a location adjacent to the back surface. The body 2 generally has a longitudinal direction extending substantially parallel to the spine, and a lateral direction extending generally transverse to the spine and perpendicular to the longitudinal direction.

The spinal mobility enhancement system 1 may generally include a body inclination apparatus 10 which is configured to support the body of the person in a variety of orientations, including an inclined position, and a spinal mobility enhancement device 50 associated with the inclination apparatus 10. In greater detail, the body inclination apparatus 10 may be configured to support the body 2 of the person in movement between an upright position, in which the spine of the patient is generally vertically oriented, and an inclined position, in which the patient spine is generally horizontally oriented. Further, the inclination apparatus 10 may be configured to support the body of the person in an inverted position, in which the head of the patient is positioned at a vertical level lower than the legs of the person, and the spine may be approaching a vertical orientation.

In embodiments, the inclination apparatus 10 may have a support platform 12 for supporting the body of the person, and the platform 12 has a platform surface 14 for positioning adjacent to the back surface of the body of the person thereon. The platform surface 14 may generally define a support plane 15, and may be elongated with opposite ends, such as a first end 16 and a second end 18. The support platform 12 may have a longitudinal direction 20 which extends between the first and second ends and is generally alignable with the spine of the person. The support platform 12 may have a lateral direction 22 which extends substantially perpendicular to the longitudinal direction 20. The longitudinal and lateral directions are generally oriented substantially parallel to the support plane 15 of the platform surface. A first end portion 24 of the support platform may be located adjacent to the first end 16 for supporting an upper portion of the torso of the body, such as a shoulders and mid back, and a second end portion 26 of the support platform may be located positioned for supporting a lower portion of the torso, such as a buttocks region of the body. The support platform 12 may have a longitudinal midline 28 which extends in the longitudinal direction of the support platform and between the opposite ends. In use, the spine of the body of the person is positionable adjacent to the longitudinal midline 28. The support platform 12 may further have opposite side boundaries 30, 32 which are located on opposite sides of the longitudinal midline 28 and may extend substantially parallel to the midline 28. The support platform 12 may also include a foot support 34 which extends from the second end 18 of the platform and may be configured to engage the feet of the body of the person. Illustratively, the foot support 34 may be configured to selectively trap each of the feet of the person to thereby maintain the body on the platform surface when the support platform is moved toward a body inverting position. In some embodiments, at least one slot 36 may be formed in the support platform 12, and the slot may extend longitudinally in orientations substantially parallel to the longitudinal midline 28 of the support platform. Optionally, the platform may include a plurality of slots 36, 38 located at different lateral spacings from the longitudinal midline 28, and may also be located at different longitudinal distances from the first end 16 of the support platform.

The inclination apparatus 10 may also include a support frame 40 for resting upon the floor or ground surface beneath the inclination apparatus, and supports the support platform 12 in an elevated condition above the floor. The support platform 12 may be pivotally mounted on the support frame 40 at a pivot 42 so as to pivot along a pivot axis 44. The pivot axis 44 is typically substantially horizontally oriented when the support frame is rested on the floor to permit alternate raising and lowering of the first end 16 and the foot support 34 of the support platform.

In embodiments, the spinal mobility enhancement device 50 of the system is movably secured on the body inclination apparatus 10 to engage the back surface of a body resting on the platform surface of the support platform. The enhancement device 50 may be positionable (and repositionable) on the support platform 12 to engage different regions or areas of the back surface of the body of the person supported on the support platform, such as locations along the longitudinal midline of the support platform. In some embodiments, the enhancement device 50 may be being removably securable to the support platform to permit removal from the platform, such as when the body inclination apparatus is utilized for other purposes.

In the illustrative embodiments, the spinal mobility enhancement device 50 includes a base portion 52 positionable adjacent to the support platform 12 during use, and may be configured to rest upon the platform surface 14. The base portion 52 has a perimeter 54, which illustratively may be substantially rectangular, and may include a base plate 56. Illustratively, the base plate 56 is formed by a substantially rigid material which may be relatively incompressible.

The spinal mobility enhancement device 50 may further include a pressure portion 60 which may be configured to cause pressure to be applied to a pair of spaced regions of the back surface of the body when the support platform is moved from the upright position to an inclined position. The spaced regions affected by the pressure portion 60 may be located on opposite sides of the longitudinal midline 28 of the support platform for applying pressure (or causing pressure to be applied) to regions of the back surface on opposite lateral sides of the spine of the body. The pressure portion 60 may be located on the base portion 52, such as on an upper side of the base plate 56.

In the illustrative embodiments, the pressure portion 60 has a pair of raised surfaces 62, 64 which are raised or elevated with respect to the support plane 15 of the platform surface when the base portion 52 is rested on the support platform 12. Illustratively, the raised surfaces 62, 64 are substantially planar or flat, and may be coplanar with each other, such as being located in substantially the same plane. Also, the raised surfaces 62, 64 may be oriented substantially parallel to the support plane 15 of the platform surface. Each of the raised surfaces 62, 64 of the pressure portion may be formed by a respective pressure element 66, 68, and each of the pressure elements may be mounted on the base plate 56 of the base portion. Illustratively, each of the pressure elements may be at least partially formed by a resiliently compressible material so that the raised surfaces 62, 64 have a degree of compliancy. The raised surfaces may provide pressure to the back surface due to the interposition of the corresponding pressure element between the platform surface and the back surface of the person, while the remaining back surface not adjacent to the pressure element is supported only by the platform surface. The pressure is achieved without vibration or other active movement of the raised surfaces.

The pair of raised surfaces 62, 64 may each be elongated in the longitudinal direction of the support platform, and each of the raised surfaces may have a substantially rectangular shape, although other shapes may be utilized. The pair of raised surfaces 62, 64 may be spaced from each other in the lateral direction 22 of the support platform, and an air gap 70 may be formed between the spaced raised surfaces such that a channel is defined between the surfaces. In implementations, the air gap 70 and channel may be aligned with the longitudinal midline 28 of the support platform, and as such the gap 70 may be aligned with the position of the spine of the body of a person supported on the platform 12.

In illustrative embodiments, each of the raised surfaces 62, 64 may have a length dimension measured in the longitudinal direction 20, a width dimension measured in the lateral direction 22, and a height dimension measured perpendicular to the support plane 15. Typically, the length dimension has a magnitude greater than the width dimension. Illustratively, the width dimension may be in the range of approximately 1 inch to 2 inches, and in one illustrative embodiment has a width dimension of approximately 1.5 inches. Also illustratively, the length dimension may be in the range of approximately 5 inches to 9 inches, and in one illustrative embodiment has a length dimension of approximately 7 inches. Further illustratively, the height dimension may be in the range of approximately 1 inch to 2 inches, and in one illustrative embodiment has a height dimension of approximately 1.5 inches.

The system 1 may further include a mounting structure 72 which is configured to mount the spinal mobility enhancement device 50 on the body inclination apparatus 10 in a manner permitting positioning (and repositioning) of the enhancement device at different locations on the support platform. Illustratively, the mounting structure 72 may enable removable mounting of the enhancement device 50 on the support platform 12.

Figure 3:
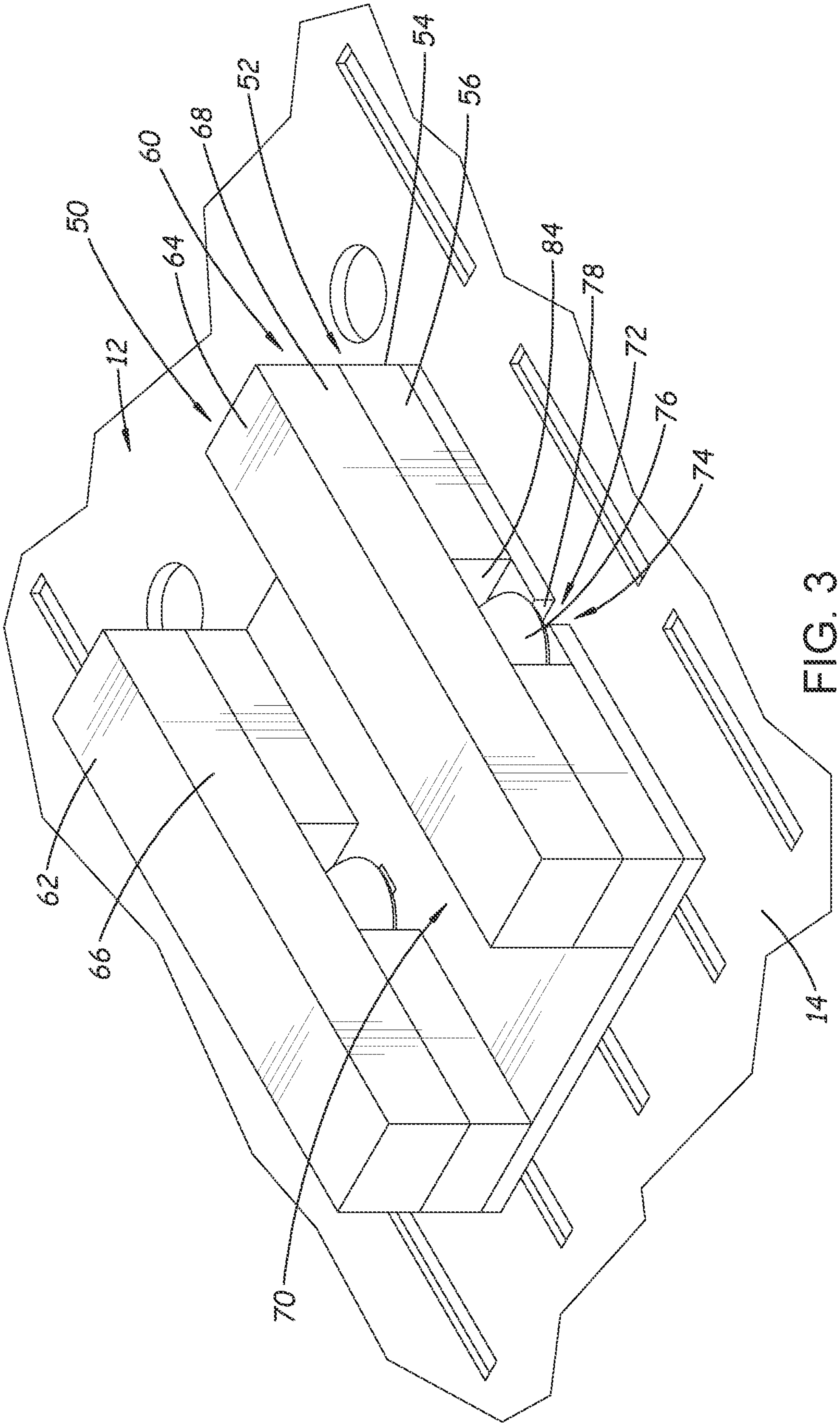
FIG. 3 is a schematic side sectional view of the mobility enhancement device mounted on the support platform using another illustrative example of the mounting structure, according to an illustrative embodiment.

In some of the illustrative embodiments, such as shown in FIG. 3, the mounting structure 72 may include a fastening assembly 74 for fastening the enhancement device 50 to the support platform 12. The fastening assembly 74 may include a fastener 76 that extends through an aperture 78 formed in the base portion of the mobility enhancement device and removably extends through an aperture 36 in the support platform. In the illustrative embodiments, the aperture 36 in the support platform includes one or more of the slots 36 in the platform. Illustratively, the fastener 76 may include an externally threaded element and an internally threaded element removably mounted on the externally threaded element, and the externally threaded element may be elongated to extend through the aperture 78 and the aperture 36. For example, the fastener may include a bolt-like element and a nut-like element.

Figure 4:
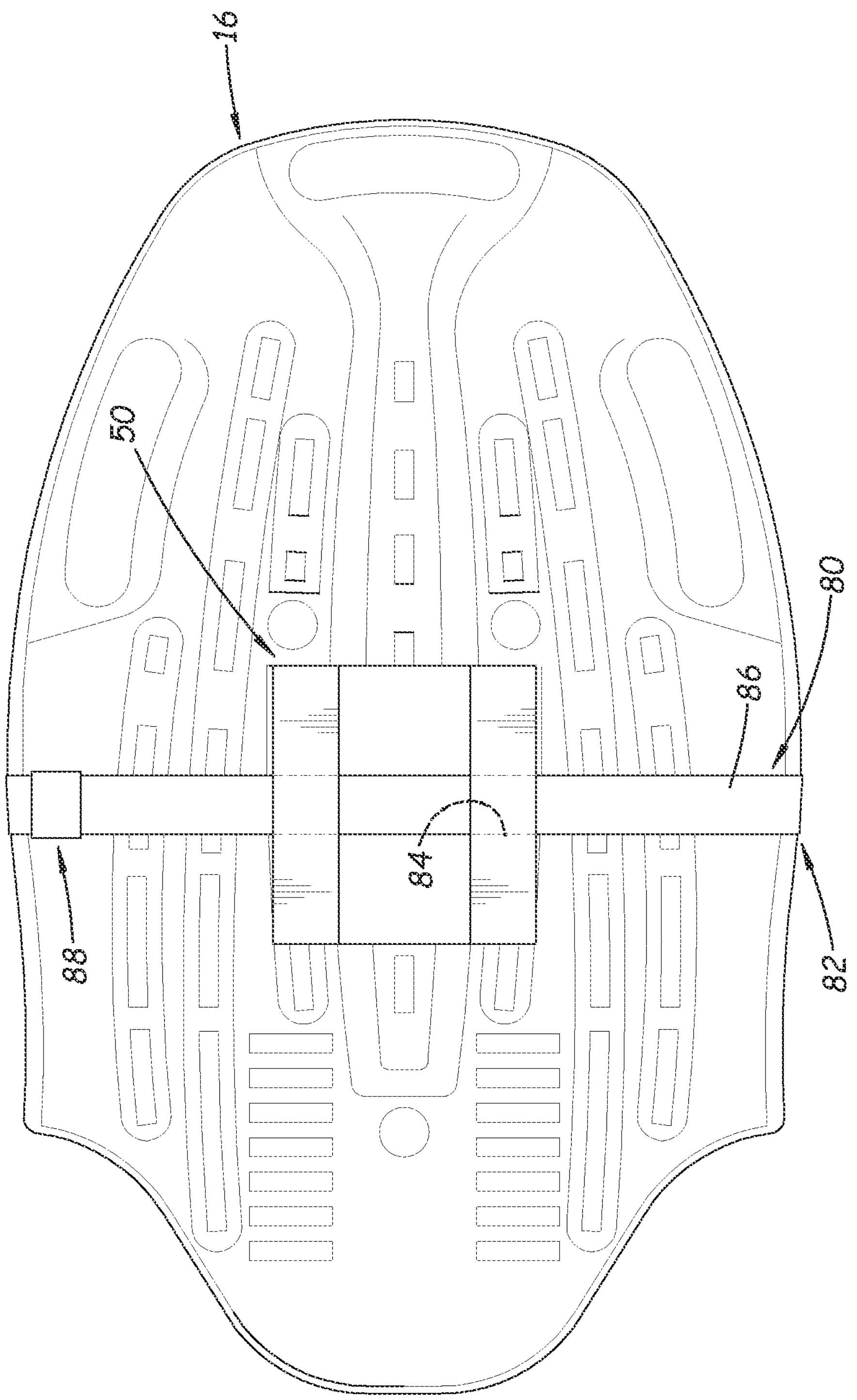
FIG. 4 is a schematic perspective view of a portion of the support platform with the mobility enhancement device mounted thereon using an illustrative example of a mounting structure, according to an illustrative embodiment.
Figure 5:
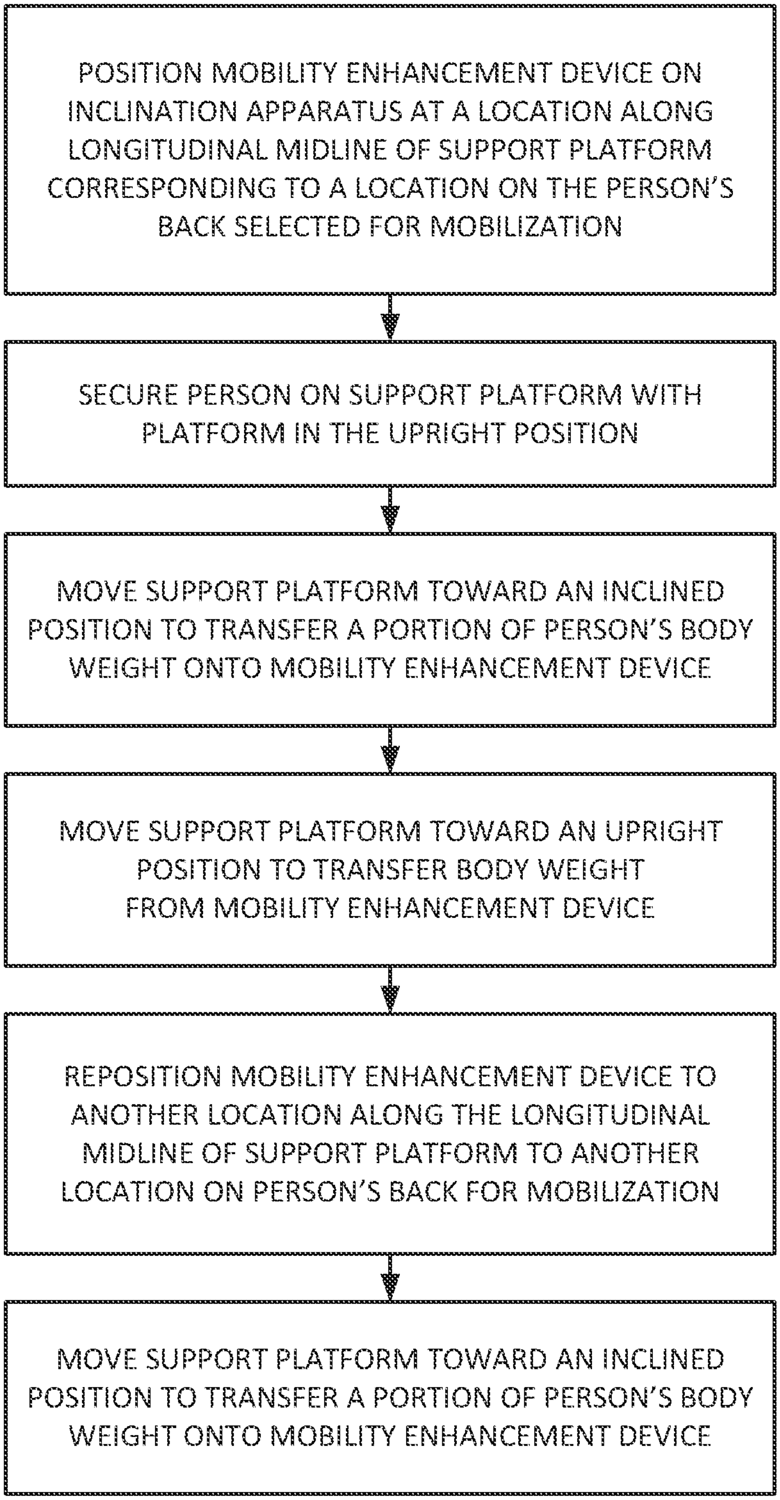
FIG. 5 is a schematic flow diagram of an exemplary method of utilization of the system, according to an illustrative implementation.

In some of the illustrative embodiments, such as shown in FIG. 4, the mounting structure 72 may include a securing assembly 80 for securing the enhancement device 50 to the support platform 12. The securing assembly 80 may include an elongated member 82 for looping about a portion of the support platform 12. In illustrative embodiments, the elongated member 82 may extend through a passage 84 formed in the mobility enhancement device, and may extend about the base portion 52 of the enhancement device and also extend laterally across the platform surface 14 of the support platform. Illustratively, the elongated member 82 may include a flexible strap 86 and a buckle 88 for connecting portions of the strap together.

In use, the spinal mobility enhancement device 50 may be rested on the platform surface 14 of the support platform, and positioned in a selected location along the longitudinal midline 28 corresponding to a portion of the spine of the patient's body desired to be manipulated using the device. Positioning of the device 50 on the support platform may be accomplished by adjusting the mounting structure 72 to secure the device 50 to the platform 12. Other preparatory steps, such as adjusting an inclination limiting strap for the platform 14, may also be performed if not previously done.

The body of the patient, including the upper torso, may then be rested against the support surface 14 and against the raised surfaces 62, 64 of the device, and this may occur while the support platform is in a substantially vertical orientation. The support platform 12 may then be moved toward an inclined position to incline the orientation of the patient's body, which may shift a portion of the weight of the torso from the patient's legs to the support surface 14, and to the raised surfaces 62, 64 of the device, and the raised nature of the surfaces 62, 64 may enhance or increase the pressure applied to the portions of the back surface of the torso that directly rest upon the surfaces 62, 64. In some implementations, the mobilization effect of the device 50 may be further enhanced by having the person press his or her back surface against the device 50 using leverage applied by the person gripping handles on the inclination apparatus. Additional mobilization may be provided by shifting or moving the position of the device 50 along the longitudinal midline 28 of the platform, such as with the platform in the upright position, and then moving the platform to an inclined position and.

It should be appreciated that in the foregoing description and appended claims, that the terms "substantially" and "approximately," when used to modify another term, mean "for the most part" or "being largely but not wholly or completely that which is specified" by the modified term, and may be further quantified as values or qualities which deviate approximately 10 percent or less from the value or quality or relationship stated in the disclosure.

It should also be appreciated from the foregoing description that, except when mutually exclusive, the features of the various embodiments described herein may be combined with features of other embodiments as desired while remaining within the intended scope of the disclosure.

Further, those skilled in the art will appreciate that steps set forth in the description and/or shown in the drawing figures may be altered in a variety of ways. For example, the order of the steps may be rearranged, substeps may be performed in parallel, shown steps may be omitted, or other steps may be included, etc.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A spinal mobility enhancement system for adjusting of a body of a person, the system comprising:

- a body inclination apparatus configured to support the body of the person in an upright position and an inclined position and positions between the upright and inclined positions, the inclination apparatus including:
  - a support platform having a platform surface for resting the body thereon, the platform surface generally defining a support plane, the support platform being elongated with a longitudinal direction and a lateral direction extending substantially perpendicular to the longitudinal direction, the support platform having a longitudinal midline extending in the longitudinal direction of the support platform for positioning the spine of the body of the person adjacent to the longitudinal midline of the support platform; and
  - a support frame for resting upon a floor and being configured to support the support platform in an elevated condition above the floor, the support platform being pivotally mounted on the support frame at a pivot so as to pivot along a pivot axis;
- a spinal mobility enhancement device movably secured on the body inclination apparatus along the longitudinal midline to engage the back surface of the body of the person on the platform surface of the support platform, the spinal mobility enhancement device comprising:
  - a base portion resting upon the platform surface;
  - a pressure portion on the base portion and being configured to cause pressure to be applied to a pair of spaced regions of the back surface of the body of the person on the platform surface when the support platform is moved from the upright position to the inclined position,
    - wherein the pressure portion has a pair of raised surfaces for contacting the pair of spaced regions of the back surface of the body of the person, the pair of raised surfaces being raised with respect to the support plane of the platform surface, the raised surfaces being substantially planar and coplanar with each other;
    - wherein the pair of raised surfaces are spaced from each other in the lateral direction of the support platform, an air gap being defined between the spaced pair of raised surfaces such that a channel is defined between the surfaces to corresponding to a position of the spine of the body of the person positioned on the platform surface of the support platform;
    - wherein each of the raised surfaces is elongated in the longitudinal direction of the support platform; and
  - a mounting structure configured to movably mount the spinal mobility enhancement device on the body inclination apparatus in a manner permitting positioning of the enhancement device at different locations along the longitudinal midline of the support platform.

2. The system of claim 1 wherein each of the raised surfaces of the pressure portion of the enhancement device is formed by a pressure element.

3. The system of claim 2 wherein the base portion is formed by a base plate formed of a substantially rigid material; and

- wherein each of the pressure elements is at least partially formed by a resiliently compressible material such that the raised surface has a degree of compliancy.

4. The system of claim 1 wherein each of the elongated raised surfaces are substantially rectangular in shape with the length of the raised surface being greater than the width of the raised surface.

5. The system of claim 1 wherein the raised surfaces are located on opposite sides of the longitudinal midline of the support platform for causing pressure to regions of the back surface on opposite lateral sides of the spine of the body.

6. The system of claim 1 wherein the raised surfaces of the pressure portion are oriented substantially parallel to the support plane of the platform surface.

7. The system of claim 1 wherein the support platform has at least one slot extending longitudinally and substantially parallel to the longitudinal midline of the support platform.

8. The system of claim 1 wherein the mounting structure comprises a fastening assembly for fastening the spinal mobility enhancement device to the body inclination apparatus, the fastening assembly including a fastener extending through an aperture in the base portion of the mobility enhancement device and extending through an aperture in the support platform.

9. The system of claim 8 wherein the aperture in the support platform comprises at least one slot extending longitudinally and substantially parallel to the longitudinal midline of the support platform.

10. The system of claim 1 wherein the mounting structure comprises a securing assembly for securing the spinal mobility enhancement device to the body inclination apparatus, the securing assembly including an elongated member for looping about a portion of the support platform, the elongated member extending through a passage in the spinal mobility enhancement device.

11. The system of claim 10 wherein the elongated member of the mounting structure comprises a flexible strap and a buckle for connecting portions of the strap together.

12. A spinal mobility enhancement system for adjusting of a body of a person, the system comprising:

a body inclination apparatus configured to support the body of the person in an upright position and an inclined position and positions between the upright and inclined positions, the inclination apparatus including:

a support platform having a platform surface for resting the body thereon, the platform surface generally defining a support plane, the support platform being elongated with a longitudinal direction and a lateral direction extending substantially perpendicular to the longitudinal direction, the support platform having a longitudinal midline extending in the longitudinal direction of the support platform for positioning the spine of the body of the person adjacent to the longitudinal midline of the support platform; and a support frame for resting upon a floor and being configured to support the support platform in an elevated condition above the floor, the support platform being pivotally mounted on the support frame at a pivot so as to pivot along a pivot axis;

a spinal mobility enhancement device movably secured on the body inclination apparatus along the longitudinal midline to engage the back surface of the body of the person on the platform surface of the support platform, the spinal mobility enhancement device comprising:

a base portion resting upon the platform surface, the base portion including a base plate;

a pressure portion on the base portion and being configured to cause pressure to be applied to a pair of spaced regions of the back surface of the body of the person on the platform surface when the support platform is moved from the upright position to the inclined position, wherein the pressure portion has a pair of raised surfaces raised with respect to the support plane of the platform surface, each of the raised surfaces being formed by a pressure element, the raised surfaces being substantially planar and coplanar with each other, each of the raised surfaces being oriented substantially parallel to the support plane of the platform surface, each of the raised surfaces being elongated in the longitudinal direction of the support platform, the elongated raised surfaces each having a length in the longitudinal direction of the support platform and a width in the lateral direction of the support platform;

wherein the pair of raised surfaces are spaced from each other in the lateral direction of the support platform, an air gap being defined between the spaced pair of raised surfaces such that the raised surfaces are located on opposite sides of the longitudinal midline of the support platform for causing pressure to regions of the back surface on opposite lateral sides of the spine of the body, a channel being defined between the raised surfaces to correspond to a position of the spine of the body of the person positioned on the platform surface of the support platform, the channel being elongated in the longitudinal direction of the support platform between the elongated raised surfaces, the channel between the raised surfaces having a length in the longitudinal direction of the support platform and a width in the lateral direction of the support platform between the raised surfaces, the width of the channel being smaller than the length of at least one of the raised surfaces.

13. The system of claim 12 wherein the base portion is formed by a base plate formed of a substantially rigid material; and wherein each of the pressure elements is at least partially formed by a resiliently compressible material such that the raised surface has a degree of compliancy.

14. The system of claim 12 additionally comprising a mounting structure configured to movably mount the spinal mobility enhancement device on the body inclination apparatus in a manner permitting positioning of the enhancement device at different locations along the longitudinal midline of the support platform.

15. A spinal mobility enhancement system for adjusting of a body of a person, the system comprising:

a body inclination apparatus configured to support the body of the person in an upright position and an inclined position and positions between the upright and inclined positions, the inclination apparatus including:

a support platform having a platform surface for resting the body thereon, the platform surface generally defining a support plane, the support platform being elongated with a longitudinal direction and a lateral direction extending substantially perpendicular to the longitudinal direction, the support platform having a longitudinal midline extending in the longitudinal direction of the support platform for positioning the spine of the body of the person adjacent to the longitudinal midline of the support platform; and a support frame for resting upon a floor and being configured to support the support platform in an elevated condition above the floor, the support platform being pivotally mounted on the support frame at a pivot so as to pivot along a pivot axis;

a spinal mobility enhancement device movably secured on the body inclination apparatus along the longitudinal midline to engage the back surface of the body of the person on the platform surface of the support platform, the spinal mobility enhancement device comprising:

a base portion resting upon the platform surface, the base portion including a base plate;

a pressure portion on the base portion and being configured to cause pressure to be applied to a pair of spaced regions of the back surface of the body of the person on the platform surface when the support platform is moved from the upright position to the inclined position, wherein the pressure portion has a pair of raised surfaces raised with respect to the support plane of the platform surface, each of the raised surfaces being formed by a pressure element, the raised surfaces being substantially planar and coplanar with each other, each of the raised surfaces being oriented substantially parallel to the support plane of the platform surface, each of the raised surfaces being elongated in the longitudinal direction of the support platform, each of the raised surfaces being substantially rectangular in shape with a length in the longitudinal direction of the support platform and a width in the lateral direction of the support platform;

wherein the pair of raised surfaces are spaced from each other in the lateral direction of the support platform, an air gap being defined between the spaced pair of raised surfaces such that the raised surfaces are located on opposite sides of the longitudinal midline of the support platform for causing pressure to regions of the back surface on opposite lateral sides of the spine of the body, a channel being defined between the surfaces to corresponding to a position of the spine of the body of the person positioned on the platform surface of the support platform;

wherein each of the raised surfaces of the pressure portion of the enhancement device is formed by a pressure element;

wherein the base portion is formed by a base plate formed of a substantially rigid material; and wherein each of the pressure elements is at least partially formed by a resiliently compressible material such that the raised surface has a degree of compliancy.

* * * * *